US012713426B2

(12) United States Patent
Huang et al.

(10) Patent No.: US 12,713,426 B2
(45) Date of Patent: Aug. 18, 2026

(54) SUPERPOSITION CODING FOR RATE CONTROL OF UPLINK CONTROL INFORMATION (UCI)

(71) Applicant: QUALCOMM Incorporated, San Diego, CA (US)

(72) Inventors: Yi Huang, San Diego, CA (US); Jing Sun, San Diego, CA (US); Mostafa Khoshnevisan, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 301 days.

(21) Appl. No.: 18/611,271

(22) Filed: Mar. 20, 2024

(65) Prior Publication Data

US 2025/0301465 A1 Sep. 25, 2025

(51) Int. Cl.

| | |
|---|---|
| ***H04W 72/1268*** | (2023.01) |
| ***H04B 7/06*** | (2006.01) |
| ***H04L 1/1812*** | (2023.01) |
| ***H04L 5/00*** | (2006.01) |
| ***H04W 72/21*** | (2023.01) |

(52) U.S. Cl.

CPC ...... *H04W 72/1268* (2013.01); *H04B 7/0626* (2013.01); *H04L 1/1812* (2013.01); *H04L 5/0051* (2013.01); *H04W 72/21* (2023.01)

(58) Field of Classification Search

CPC ... H04L 5/0051; H04L 1/1812; H04B 7/0626; H03W 72/21; H03W 72/1268

USPC .......................................................... 370/329

See application file for complete search history.

(56) References Cited

U.S. PATENT DOCUMENTS

| | | | | |
|---|---|---|---|---|
| 2019/0007248 | A1* | 1/2019 | Takeda | H04L 1/1861 |
| 2022/0377791 | A1* | 11/2022 | Nogami | H04W 74/0808 |
| 2023/0180260 | A1* | 6/2023 | Nogami | H04L 5/0053 370/329 |
| 2023/0353276 | A1* | 11/2023 | Park | H04L 5/00 |
| 2023/0379966 | A1* | 11/2023 | Nogami | H04W 74/0808 |

OTHER PUBLICATIONS

International Search Report and Written Opinion—PCT/US2025/016011—ISA/EPO—May 9, 2025.

3GPP TS 38.212: "3rd Generation Partnership Project, Technical Specification Group Radio Access Network, NR, Multiplexing and Channel Coding (Release 18)", 3GPP TS 38.212, V18.1.0, Dec. 2023, pp. 1-293.

3GPP TS 38.214: "3rd Generation Partnership Project, Technical Specification Group Radio Access Network, NR, Physical Layer Procedures for Data (Release 18)", 3GPP TS 38.214, V18.1.0, Dec. 2023, pp. 1-290.

* cited by examiner

*Primary Examiner* — Peter G Solinsky

(74) *Attorney, Agent, or Firm* — Patterson+ Sheridan, L.L.P.

(57) ABSTRACT

Aspects of the present disclosure relate to wireless communications, and more particularly, to techniques for communication uplink control information (UCI). One aspect provides a method for wireless communication. The method includes generating a physical uplink shared channel (PUSCH) having at least one resource element (RE) for communicating uplink control information (UCI), wherein at least a portion of the UCI is encoded and mapped to a first subset of bits of the at least one RE, and wherein a portion of data is encoded and mapped to a second subset of bits of the at least one RE; and transmitting the PUSCH including the data and the UCI.

18 Claims, 15 Drawing Sheets

100
IP Services
197
176
5GC
190
EPC
160
Other AMFs
193
AMF
192
SMF
194
UPF
195
UDM
196
Other MMEs
164
MME
162
MBMS GW
168
Serving Gateway
166
BM-SC
170
PDN Gateway
172
HSS
174
132
184
102/180
182'
182''
182
104
110
120
140
145
158
134
102
102 (102')
110 (110')
150
152
154

One Frame (TDD)
10 ms
400
subframe
RB
slot
D D D D D D D D D D D D X U
subcarrier
OFDM symbol
slot
DMRS Rx
CSI-RS
430
PDCCH
SSS
PSS
PDSCH
PBCH
20 RBs
SS/PBCH Block
system bandwidth RBs
One Frame (TDD)
10 ms
450
subframe
RB
slot
D X U U U U U U U U U U U U
subcarrier
OFDM symbol
slot
SRS
SRS Comb 0
SRS Comb 1
DMRS R
480
PUCCH
PUSCH

SUPERPOSITION CODING FOR RATE CONTROL OF UPLINK CONTROL INFORMATION (UCI)

FIELD OF THE DISCLOSURE

Aspects of the present disclosure relate to wireless communications, and more particularly, to techniques for communication uplink control information (UCI).

DESCRIPTION OF RELATED ART

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication. The method includes generating a physical uplink shared channel (PUSCH) having at least one resource element (RE) for communicating uplink control information (UCI), wherein at least a portion of the UCI is encoded and mapped to a first subset of bits of the at least one RE, and wherein a portion of data is encoded and mapped to a second subset of bits of the at least one RE; and transmitting the PUSCH including the data and the UCI.

Another aspect provides a method for wireless communication. The method includes receiving a physical uplink shared channel (PUSCH) having at least one resource element (RE) for communicating uplink control information (UCI), wherein at least a portion of the UCI is encoded using and mapped to a first subset of bits of the at least one RE, and wherein a portion of data is encoded and mapped to a second subset of bits of the at least one RE; and decoding the PUSCH including the data and the UCI.

Other aspects provide: an apparatus operable, configured, or otherwise adapted to perform any one or more of the aforementioned methods and/or those described elsewhere herein; a non-transitory, computer-readable media comprising instructions that, when executed (e.g., directly, indirectly, after pre-processing, without pre-processing) by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Aspects of the present disclosure provide apparatuses, methods, processing systems, and computer-readable mediums for communicating uplink control information (UCI) on a physical uplink shared channel (PUSCH). For example, UCI may be multiplexed with data on the PUSCH. UCI may be encoded on one or more most significant bits (MSBs) of at least one resource element (RE) for the PUSCH and data may be encoded on one or more least significant bits (LSBs) of the at least one RE, as described in more detail herein.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
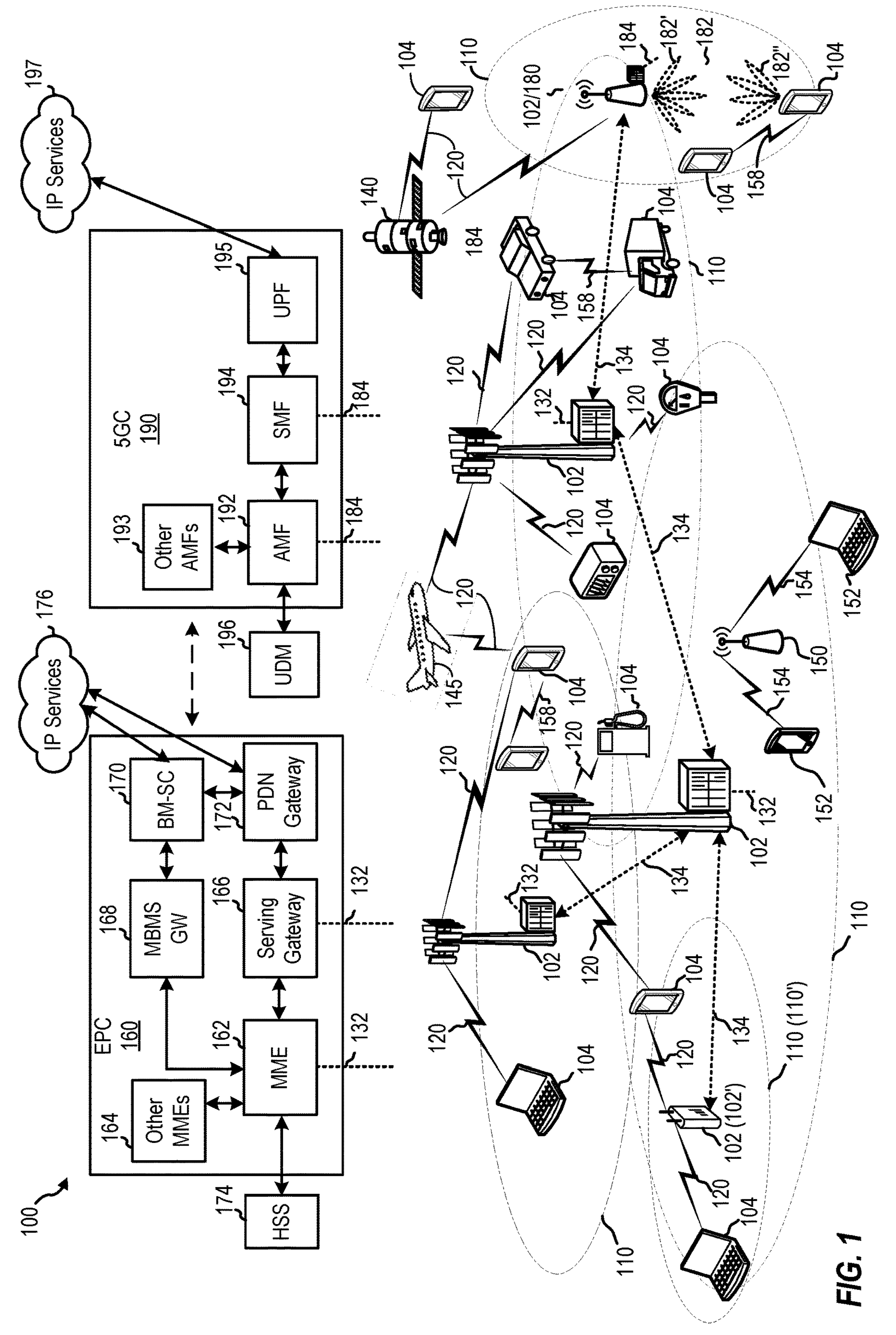
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (CNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
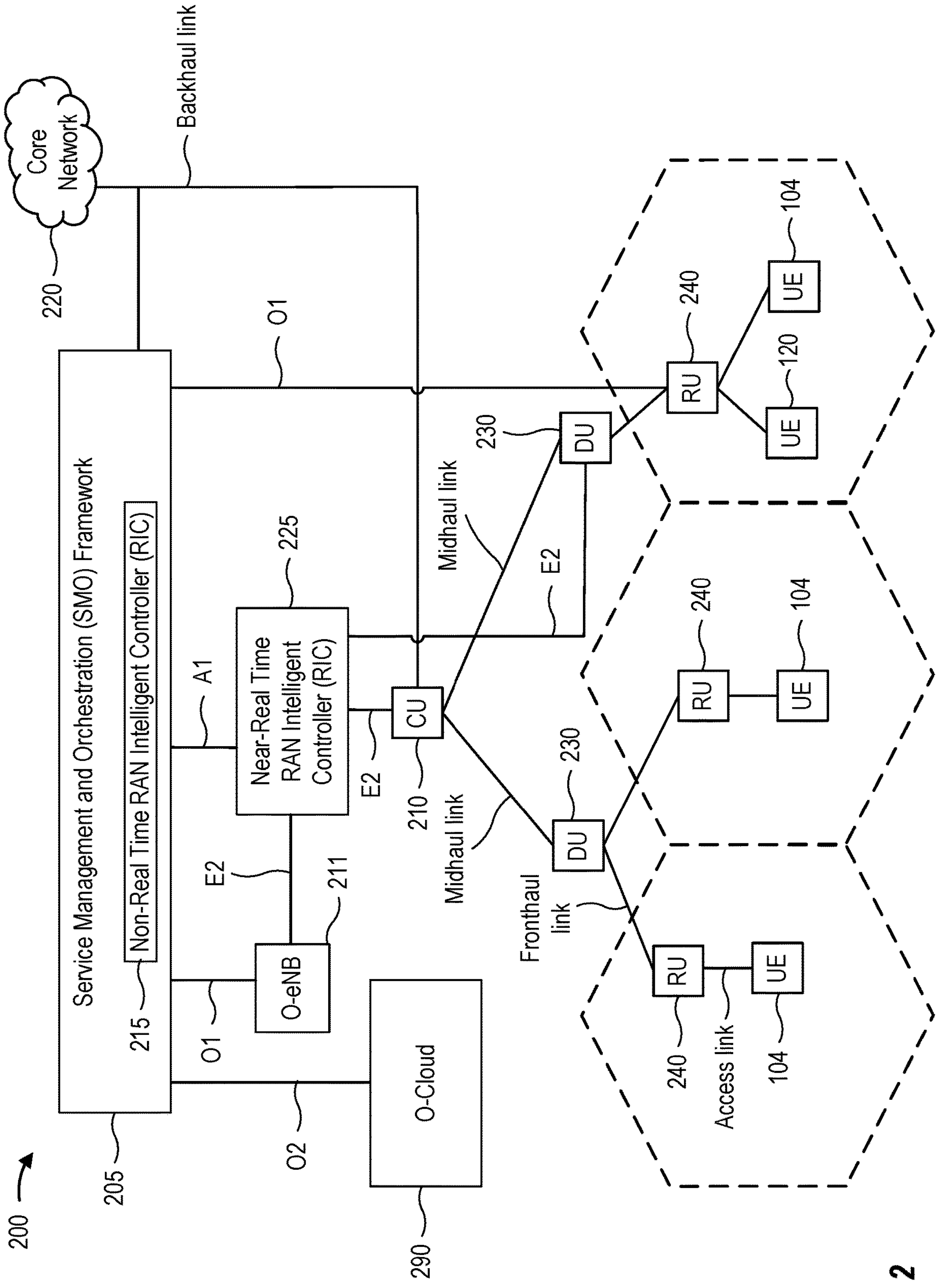
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as “Sub-6 GHz”. Similarly, 3GPP currently defines Frequency Range 2 (FR2) as including 24,250 MHz-71,000 MHZ, which is sometimes referred to (interchangeably) as a “millimeter wave” (“mmW” or “mmWave”). In some cases, FR2 may be further defined in terms of sub-ranges, such as a first sub-range FR2-1 including 24,250 MHz-52,600 MHz and a second sub-range FR2-2 including 52,600 MHz-71,000 MHz. A base station configured to communicate using mm Wave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
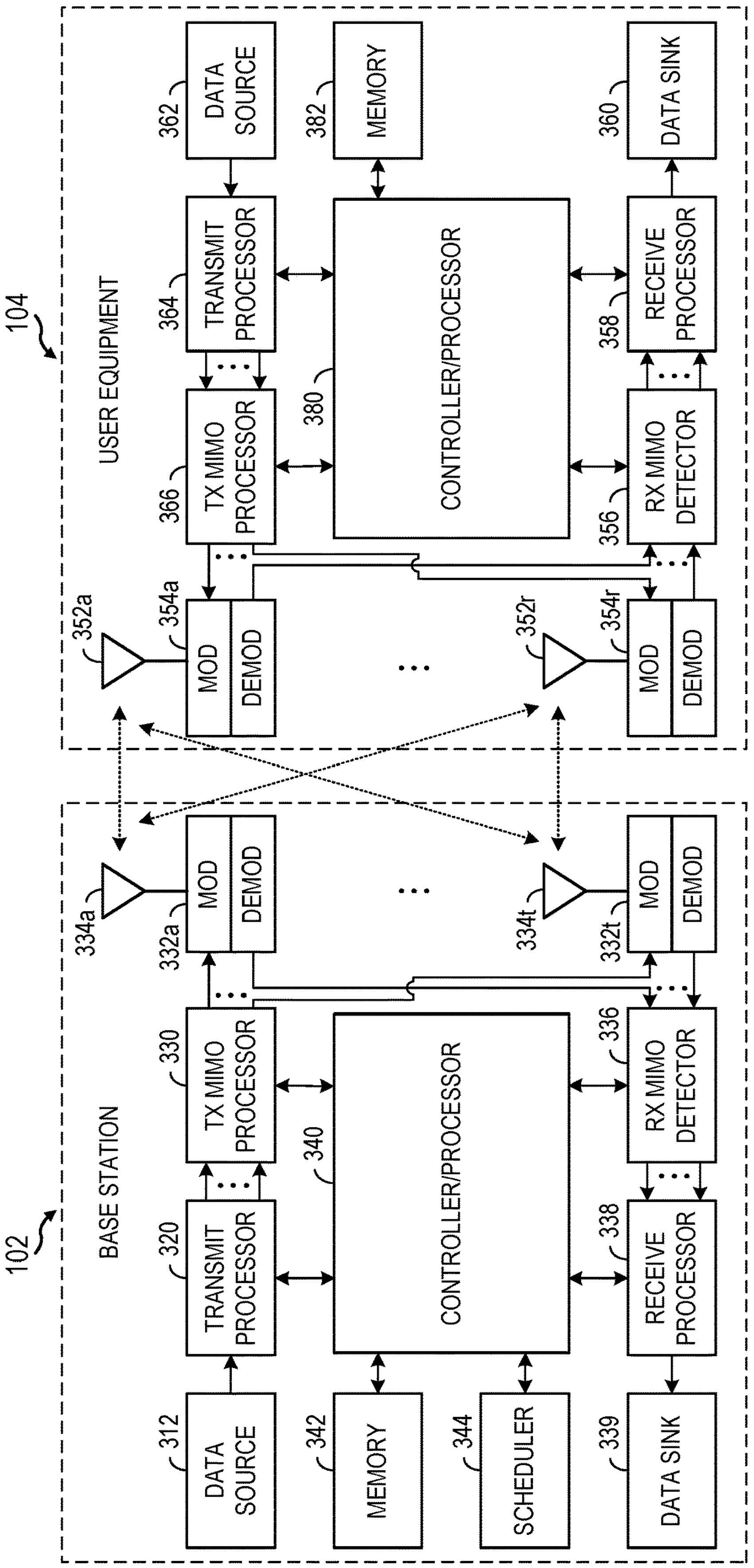
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, one or more processors may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4B:
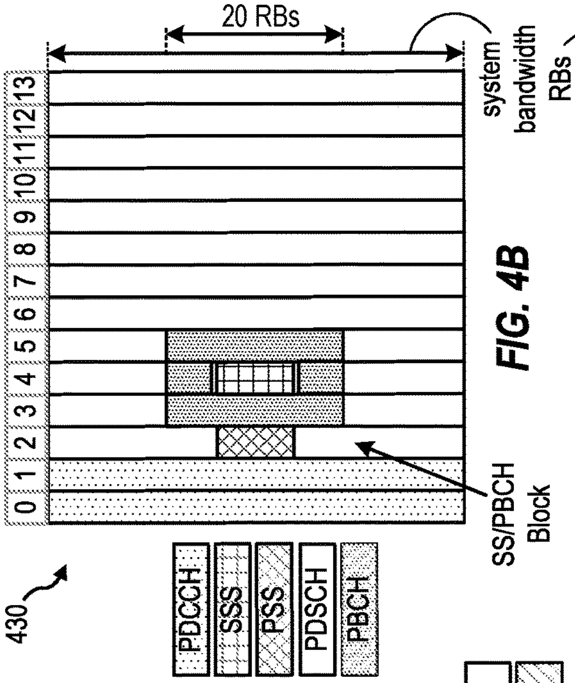
FIGS. 4A, 4B, 4C, and 4D depict various example aspects of data structures for a wireless communications network.
Figure 4D:
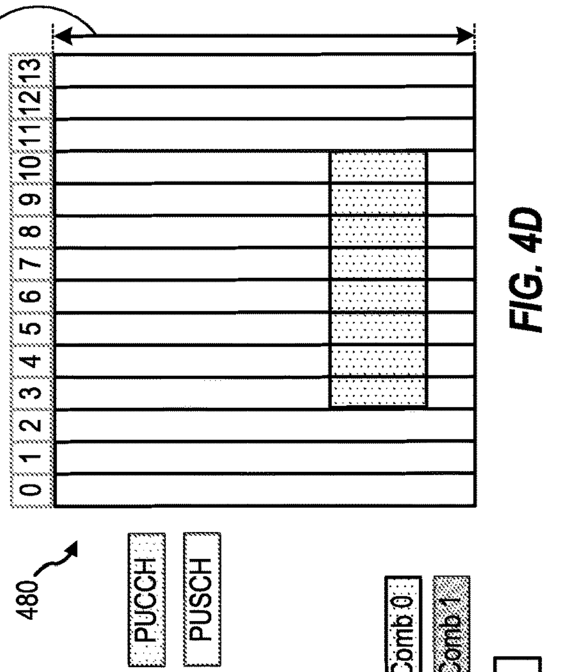
Figure 4A:
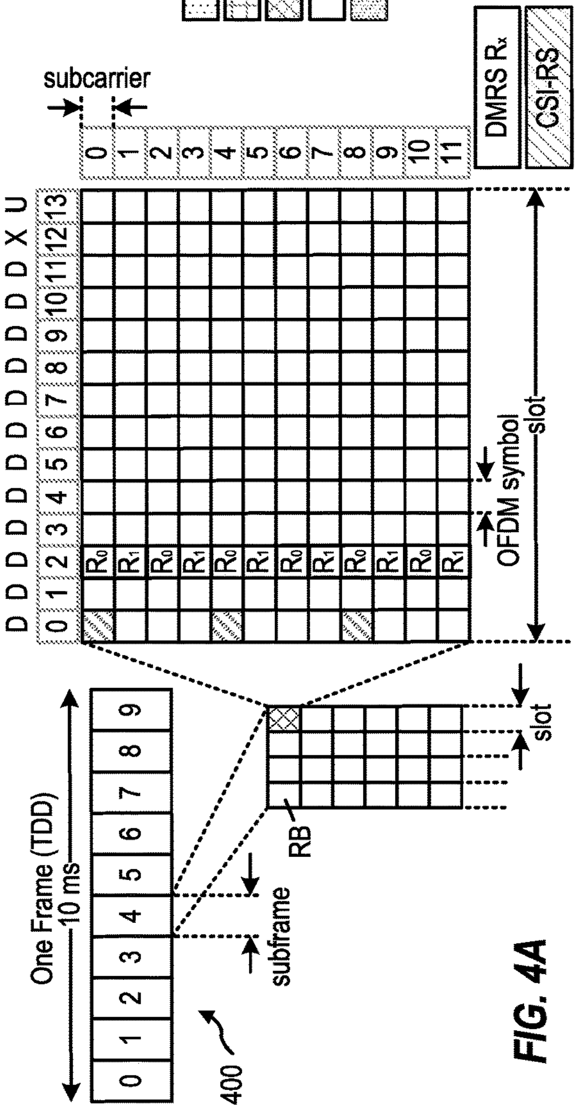
Figure 4C:
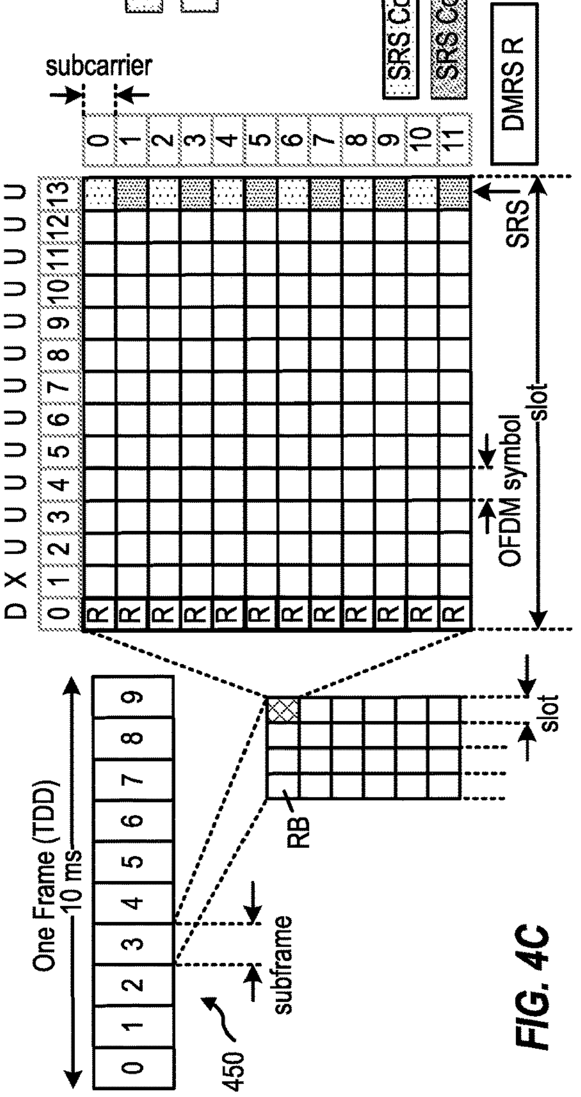

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 6 allow for 1, 2, 4, 8, 16, 32, and 64 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to 24× 15 kHz, where u is the numerology 0 to 6. As such, the numerology μ=0 has a subcarrier spacing of 15 kHz and the numerology μ=6 has a subcarrier spacing of 960 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Uplink Control Information (UCI) Communication

Certain aspects of the present disclosure are directed towards multiplexing uplink control information (UCI) with data on a physical uplink shared channel (PUSCH). For example, in some aspects, UCI may be encoded on one or more most significant bits (MSBs) of a modulation symbol on PUSCH, and data may be encoded on one or more least significant bits (LSBs) of the modulation symbol.

Figure 5:
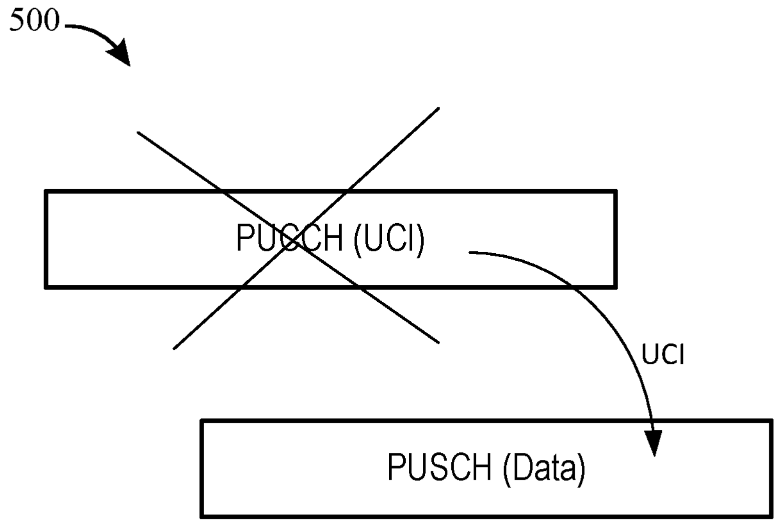
FIG. 5 illustrates a physical uplink control channel (PUCCH) overlapping in time with a physical uplink shared channel (PUSCH).

FIG. 5 is a diagram 500 illustrating a physical uplink control channel (PUCCH) overlapping in time with a physical uplink shared channel (PUSCH). As shown, the PUCCH may include uplink control information (UCI), which may include hybrid automatic repeat request (HARQ) information (e.g., acknowledgement (ACK) or negative ACK (NACK), or in some cases, channel state information (CSI) used to perform channel measurements. The PUSCH may be used to communicate data. The PUCCH may overlap with the PUSCH in some cases. Due to the overlap, the PUCCH may not be transmitted, and instead, the UCI of the PUCCH may be carried as part of (e.g., encoded on) the PUSCH.

Figure 6:
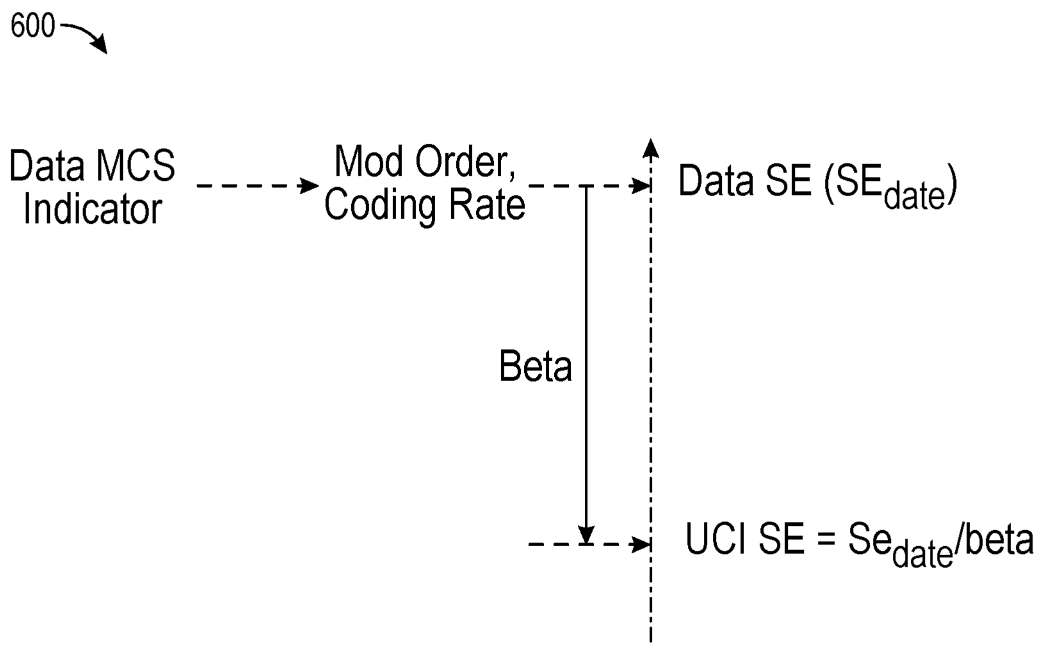
FIG. 6 illustrates example techniques for calculating a spectral efficiency (SE) for data and uplink control information (UCI).

FIG. 6 is a diagram 600 illustrating example techniques for calculating the spectral efficiency (SE) for data and UCI. The data SE may be calculated based on a data modulation coding scheme (MCS) indicator that may indicate the modulation order and coding rate. For example, the SE may be calculated based on a product of the modulation order and the coding rate. Once the data SE (SEdata) is calculated, the SE for UCI may be calculated using an adjustment parameter (beta) from SEdate. For example, UCI SE may be calculated as SEdata/beta. Thus, the adjustment parameter beta may control the SE backoff/scaling from data to UCI, as shown.

The UCI modulation order may be equal to the data modulation order and the UCI code rate may be equal to the data code rate/beta. For example, assume the data modulation order is 256 quadrature amplitude modulation (QAM), the data code rate is ½, and the adjustment parameter beta is equal to ⅛. In this case, the UCI modulation order may be 256QAM and the code rate for UCI may be 1⁄16 (e.g., ½×⅛). In some aspects, the beta to be used for determining UCI SE may be indicated to a user equipment (UE) by a base station (BS).

In some cases, an inefficient combination of modulation order and coding rate may be selected. For example, using a high modulation order and a low coding rate to achieve UCI SE may result in degraded performance and reliability for UCI communication. In some implementations, communication of UCI and data may be allowed to have different modulation orders to allow for a better combination of modulation order and coding rate for UCI. UCI modulation order may be set to quadrature phase-shift keying (QPSK) to allow for different modulation orders between UCI and data. For example, the data modulation order may be set to 256QAM and the code rate may be equal to ½. The adjustment parameter beta may be set to ⅛. If a different modulation order is allowed for UCI, the UCI modulation order may be set to QPSK. Therefore, using a different modulation order may set the code rate for UCI to ¼, providing improved performance and reliability compared to using a UCI modulation order of 256QAM and a code rate of 1/16. In other words, by reducing the modulation order, the coding rate may be increased to improve UCI communication performance and reliability. Nested constellation mapping is one way to handle the different modulation orders between UCI and data.

Figure 7:
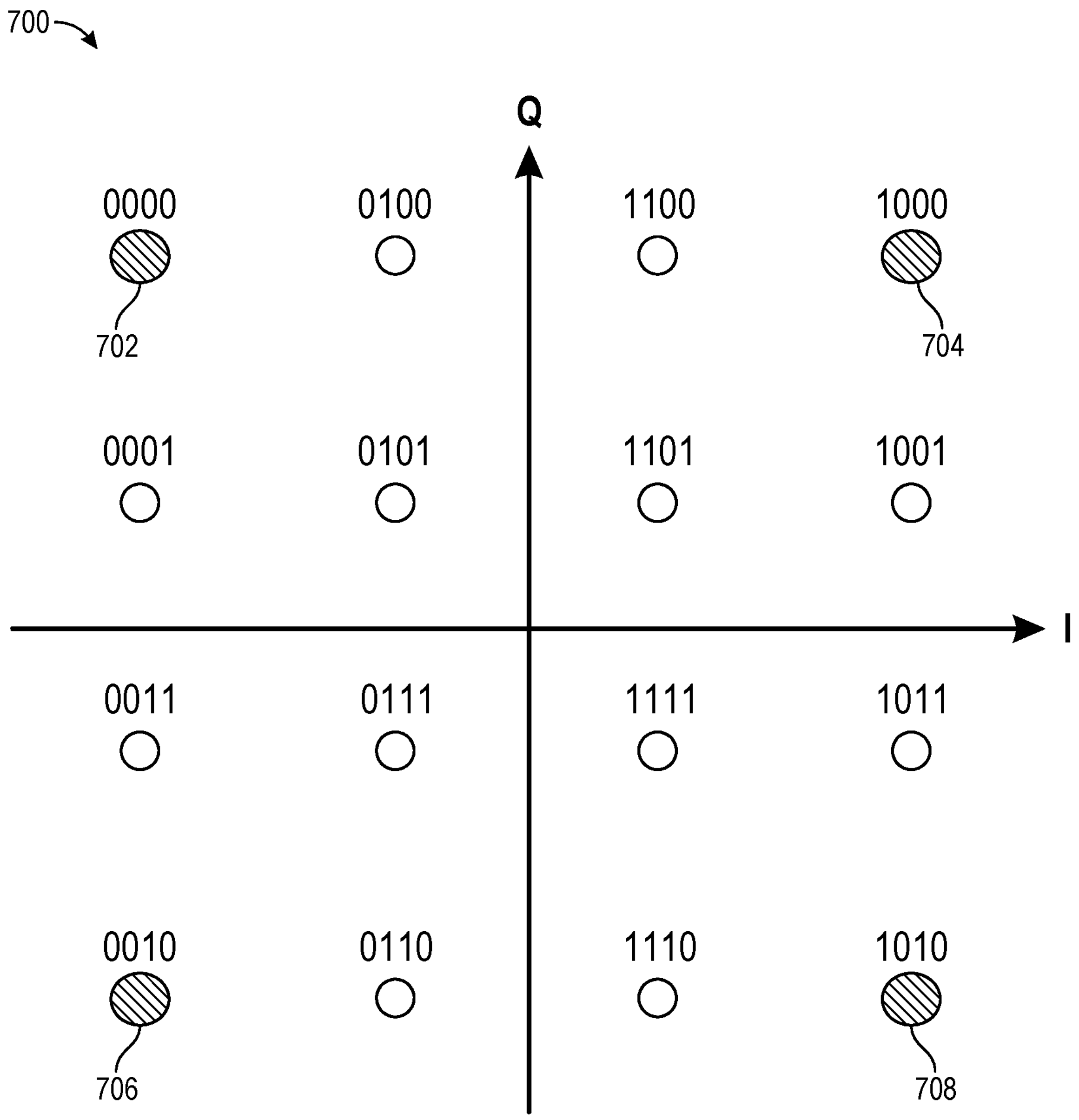
FIG. 7 illustrates symbols for a modulation scheme.

FIG. 7 illustrates symbols 700 for a 16QAM modulation scheme. To implement UCI with QPSK, the QPSK constellation may be nested in the 16QAM modulation. For example, the UCI may be communicated using the four corner symbols 702, 704, 706, 708 of the 16QAM modulation scheme, effectively implementing QPSK for UCI. This technique may result in the UCI resource element (RE) having higher power than the data RE, resulting in larger out-of-band emission at the UE. In some cases, to reduce this impact on the UE, UCI may not be mapped to edge resource blocks (RBs), and a comb-based UCI RE mapping may be used. This technique may also impact the BS. For example, the BS may have to handle two different power levels for data OFDM symbols. The BS may also have to zero out the log-likelihood ratio (LLR) for the unused constellation points on UCI REs, adversely impacting communication efficiency. Certain aspects of the present disclosure are directed toward using superposition coding to improve data communication performance while facilitating UCI encoding on PUSCH.

Figure 8:
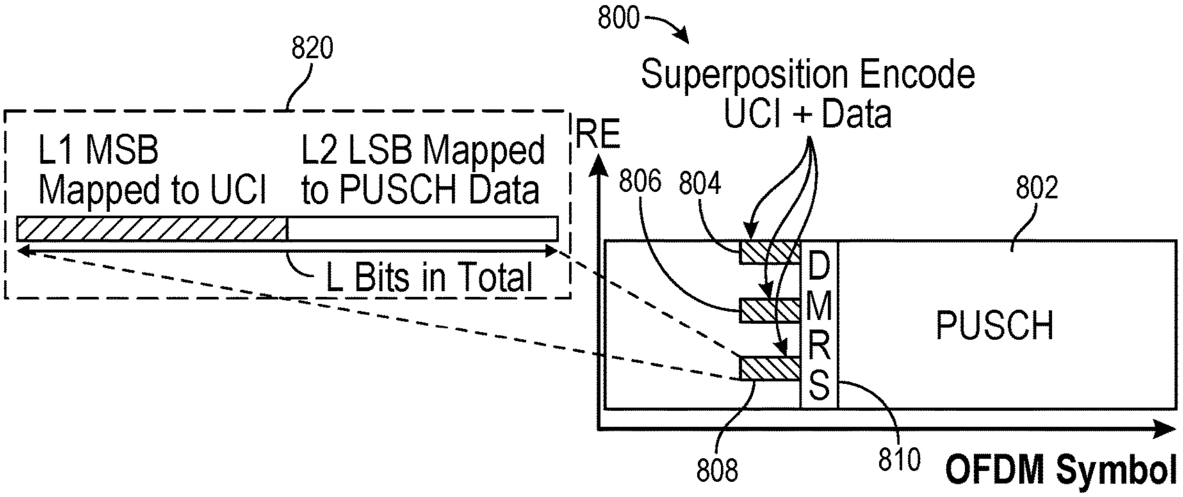
FIG. 8 illustrates an example PUSCH with superposition UCI encoding, in accordance with certain aspects of the present disclosure.

FIG. 8 illustrates an example PUSCH 800 with superposition UCI encoding, in accordance with certain aspects of the present disclosure. The PUSCH may carry data 802 and UCI REs 804, 806, 808, which may be next to (e.g., in time) demodulation reference signal (DMRS) 810. In some aspects, the UCI REs may use the same modulation order and rank as the data REs.

In some aspects, superposition coding may be applied to UCI REs. For example, a UCI RE may transmit in total L encoded bits, wherein L=M×K, M being the modulation order and K being the rank signaled to the UE by the BS. To implement the superposition coding, the UE may map encoded UCI bits to L1 bit locations shown in diagram 820, and map encoded PUSCH data to L2 bit locations shown in diagram 820, where L=L1+L2. In some aspects, L1 may be one or more most significant bits (MSBs) of a UCI RE and L2 may be one or more least significant bits (LSBs) of the UCI RE which may be used to communicate PUSCH data. For example, referring back to the 16QAM consolation shown in FIG. 7, two MSBs of a symbol may be used to encode UCI and two LSBs may be used to encode data. Typically, decoding of MSBs may be more reliable than LSBs. Thus, as UCI may be more important than data, UCI may be mapped to one or more MSBs and data may be mapped to one or more LSBs, providing increased reliability for communicating UCI. The LSBs on UCI RE(s) provide additional bit positions to improve PUSCH data performance compared to conventional implementations.

Certain aspects of the present disclosure provide techniques for using the additional bit positions by assigning the L2 LSBs to one or more PUSCH code blocks (CBs) of the PUSCH. Rate matching of PUSCH may be performed based on the following equation (e.g., using a floor operation) for a subset of CBs of the PUSCH:

$$E_r = N_L \times Q_m \left\lfloor \frac{G}{N_L Q_m C'} \right\rfloor$$

and using the following equation (e.g., using a ceiling operation) for a last CB of the PUSCH:

$$E_r = N_L \times Q_m \left\lceil \frac{G}{N_L Q_m C'} \right\rceil$$

where G is the total number of encoded data bits in the PUSCH, C' is the total number of CBs in the PUSCH, $N_L$ is the number of multiple-input multiple-output (MIMO) layers, $Q_m$ is the modulation order, and $E_r$ is the rate matching output sequence length. Using the equations, the number of encoded bits may be split equally across the CBs of the PUSCH, except that the last CB of the PUSCH may be encoded with one more RE (e.g., hence providing $N_L \times Q_m$ more bits for the last CB) due to the ceiling operation. Certain aspects consider CB decoding timeline or CB decoding performance when determining how to assign the additional bit positions for data across the CBs.

Certain aspects are directed towards PUSCH rate matching around UCI. In some aspects, the additional bit positions may be evenly shared on UCI REs across all CBs of the PUSCH. The number of encoded bits (represented by $E'_r$) in each CB may be determined based on the following equation for a subset of CBs (e.g., all CBs except a last CB) of the PUSCH:

$$E'_r = N_L\, Q_m \left\lfloor \frac{G_{non-UCI}}{N_L\, Q_m C'} \right\rfloor + N_L\, (Q_m - MSB) \left\lfloor \frac{G_{UCI}}{N_L\, (Q_m - MSB) C'} \right\rfloor$$

and based on the following equation for a last CB of the PUSCH:

$$E'_r = N_L\, Q_m \left\lceil \frac{G_{non-UCI}}{N_L\, Q_m C'} \right\rceil + N_L (Q_m - MSB) \left\lceil \frac{G_{UCI}}{N_L\, (Q_m - MSB) C'} \right\rceil$$

Certain aspects provide a PUSCH rate matching or RE mapping procedure.

Figure 9:
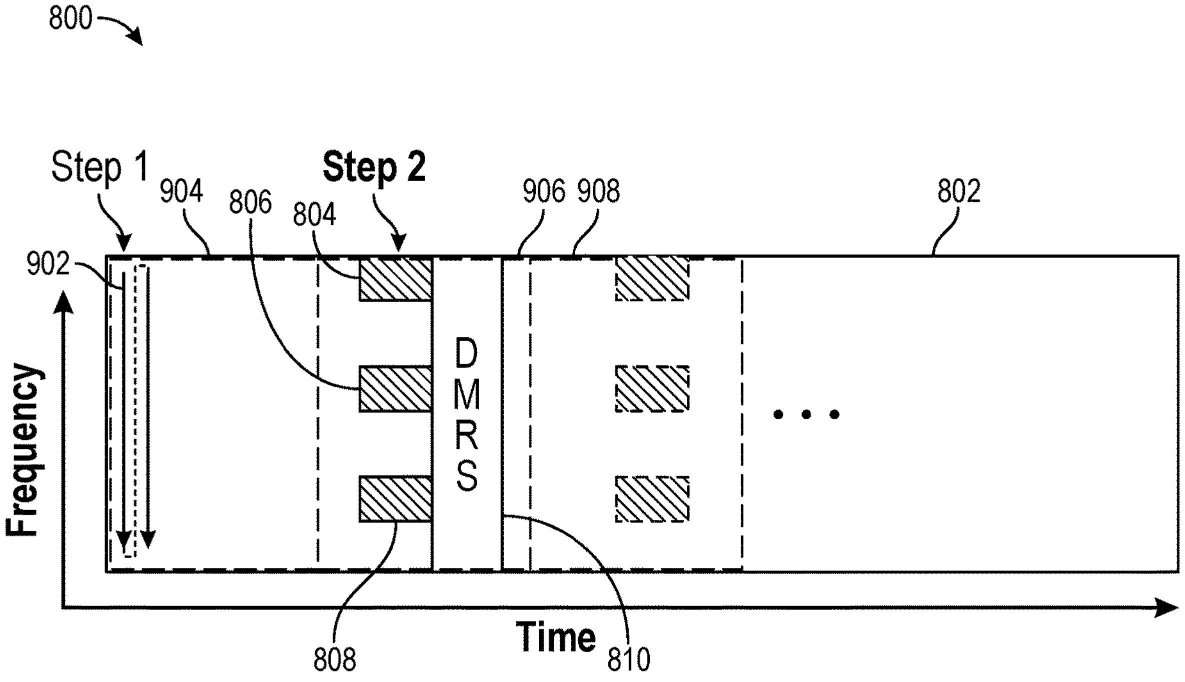
FIG. 9 illustrates encoding of data and UCI for a PUSCH, in accordance with certain aspects of the present disclosure.

FIG. 9 illustrates encoding of data and UCI for the example PUSCH 800, in accordance with certain aspects of the present disclosure. As shown, as part of a first step (Step 1), encoded bits (e.g., data) are mapped to non-UCI REs using frequency first, time second fashion, as represented by arrow 902. The PUSCH 800 may include multiple CBs, such as CBs 904, 906, 908. The number of encoded bits of each CB (e.g., CB r) may be calculated, and then assigned to the CB in a frequency first, time second fashion, as shown. The number of encoded bits of each CB may be calculated based on the expression:

$$N_L\, Q_m \left\lfloor \frac{G_{non-UCI}}{N_L\, Q_m C'} \right\rfloor$$

where r=0 to C'−1, and $G_{non-UCI}$ is the total number of non-UCI (e.g., data) encoded data bits in the PUSCH. A second step (Step 2) of the procedure may involve mapping UCI REs in a frequency first and time second fashion. For example, the UCI bits may be encoded in the UCI REs 804, 806, 808 in frequency first, time second fashion. The encoded bits for UCI in CB r may be calculated per expression:

$$N_L(Q_m - MSB)\left\lfloor \frac{G_{UCI}}{N_L(Q_m - MSB)C'} \right\rfloor$$

where $G_{UCI}$ is the total number of UCI encoded bits in the PUSCH, and MSB is the number of MSB(s) assigned to UCI. In some cases, decoding of a first CB (CB 1) of the PUSCH may be delayed. However, this delay may not impact the total decode time of the PUSCH because CB 1 decode may have to wait until DMRS estimation.

In some aspects, the additional bit positions (e.g., L2 bits) for data may be shared evenly on UCI REs across all CBs. The encoded bits of each CB (e.g., CB r) may be determined for a subset of CBs of the PUSCH per the equation:

$$E'_r = N_L Q_m \left\lfloor \frac{G_{non\text{-}UCI}}{N_L Q_m C'} \right\rfloor + N_L(Q_m - MSB)\left\lceil \frac{G_{UCI}}{N_L(Q_m - MSB)C'} \right\rceil$$

In this case, the non-UCI encoded bits may be determined using a floor function, whereas the UCI encoded bits may be determined using a ceiling function. For a last CB of the PUSCH, the encoded bits may be determined based on equation:

$$E'_r = N_L Q_m \left\lceil \frac{G_{non\text{-}UCI}}{N_L Q_m C'} \right\rceil + N_L(Q_m - MSB)\left\lfloor \frac{G_{UCI}}{N_L(Q_m - MSB)C'} \right\rfloor$$

In this case, the non-UCI encoded bits may be determined using a ceiling function and the UCI encoded bits may be determined using a floor function. Thus, in this manner, a subset of CBs (all CBs except the last CB) of the PUSCH may be encoded with one additional UCI RE as compared to the last CB of the PUSCH, and the subset of CBs (all CBs except the last CB) of the PUSCH may be encoded with one fewer non-UCI RE as compared to the last CB of the PUSCH.

In some aspects, additional bit positions on UCI REs for data may only be assigned to one or more CBs (e.g., or a subset of a CB). For example, a PUSCH may include multiple CBs with UCI REs. For instance, the CBs 906, 908 may include UCI REs, in some implementations. Only the REs of a subset of the CBs (e.g., CB 906) may have additional bit positions (e.g., LBSs) assigned to data as described herein. For instance, a BS may indicate that additional L2 LSBs should be mapped to which CB(s). Based on previous slot PUSCH decoding, the BS may determine CB(s) to which the additional bit positions are to be mapped. That is, the BS may determine that certain CBs of the PUSCH failed decoding (e.g., or have a higher failure rate) based on previous slot PUSCH decoding. This may be due to a bad channel or strong interference on certain OFDM symbols of certain CBs. Thus, the BS may determine that there is an increased likelihood that the CBs on those OFDM symbols would fail in the current slot again. Therefore, the BS may indicate, to the UE, to use the additional L2 LSBs for those CBs to encode data, increasing the data reliability of those CBs. In some aspects, the additional L2 LSBs may be mapped to one or more first CBs (e.g., one or more CBs first in time in the PUSCH) based on pre-configuration (e.g., as specified in a standard), facilitating receiver CB decoding timeline.

Figure 10:
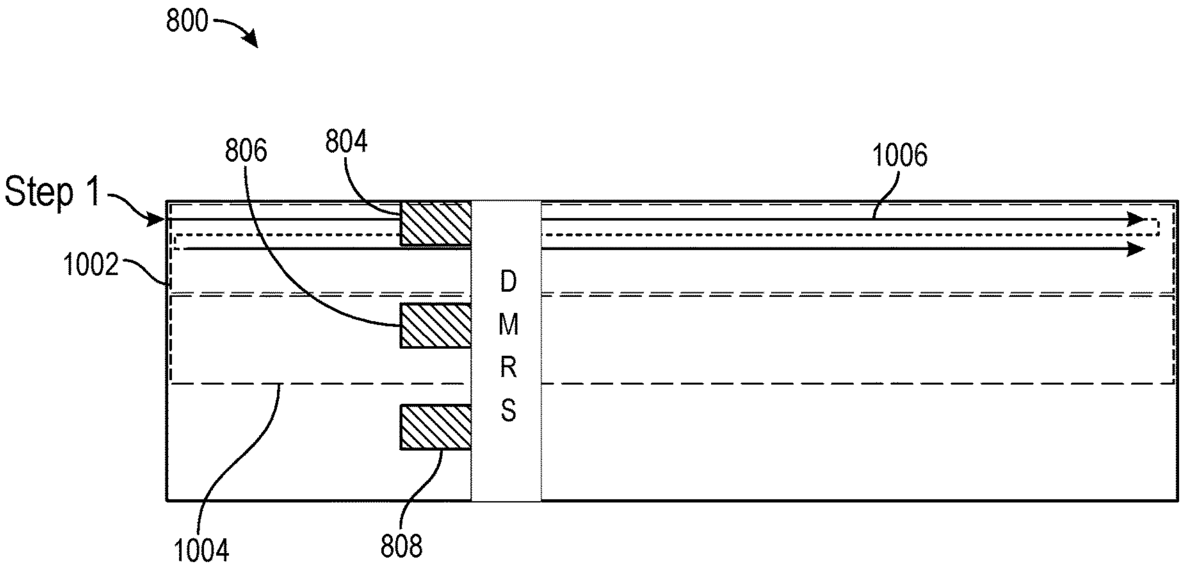
FIG. 10 illustrates encoding of data for a PUSCH in a time first, frequency second fashion, in accordance with certain aspects of the present disclosure.

FIG. 10 illustrates encoding of data for the example PUSCH 800 in a time first, frequency second fashion, in accordance with certain aspects of the present disclosure. As shown, the PUSCH 800 may include multiple CBs, such as CBs 1002, 1004. For each CB, the UE may map the encoded PUSCH bits (data) to REs in time first, frequency second fashion, as represented by arrow 1006. The data bits may be assigned to the L2 LSBs of UCI REs in the process of being mapped in the time first, frequency second fashion as shown. In this way, the additional bits on UCI REs are naturally shared among all CBs with high likelihood.

Certain aspects of the present disclosure are directed towards PUSCH MSB/LSB being punctured by UCI. For example, PUSCH rate matching may follow legacy rules as if there is no UCI on PUSCH. In other words, data bits may be assigned to REs of the PUSCH as if there is no UCI on the PUSCH. Then, UCI encoded bits may be mapped to UCI REs by puncturing the data bits. For example, HARQ-ACK may be assigned to and puncture MSBs of PUSCH REs. In some cases, CSI may puncture LSBs of PUSCH.

Figure 11:
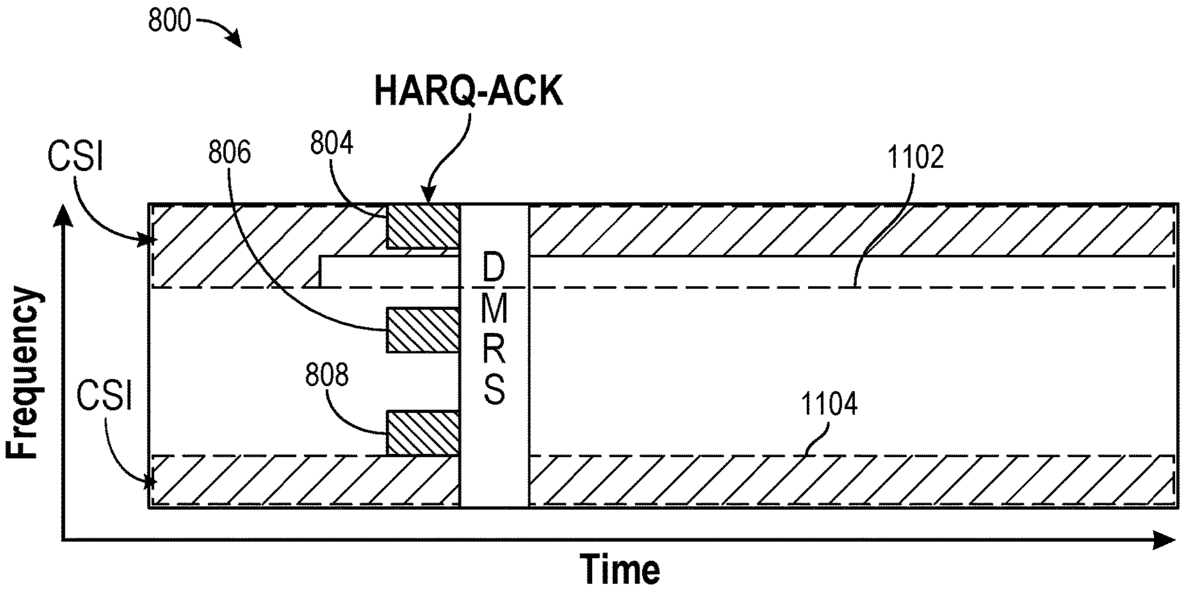
FIG. 11 illustrates assignment of feedback and CSI on a PUSCH, in accordance with certain aspects of the present disclosure.

FIG. 11 illustrates the assignment of HARQ-ACK and CSI on the PUSCH 800, in accordance with certain aspects of the present disclosure. HARQ ACK REs may be mapped to OFDM symbols around DMRS, following a frequency first and time second ordering. For example, HARQ-ACK bits may be assigned to MSBs of UCI REs 804, 806, 808.

After data is assigned to the PUSCH, CSI RE mapping (puncturing data bits) may follow a time first frequency second ordering to distribute the puncturing impact evenly to all PUSCH CBs. In some aspects, CSI RE mapping may be performed using mirror hopping to explore potential frequency diversity. In other words, as shown, a portion of CSI may be mapped to frequency region 1102 at a top frequency portion of the PUSCH spectrum and another portion of CSI may be mapped to frequency region 1104 at a bottom frequency portion of the PUSCH spectrum.

Example Operations

Figure 12:
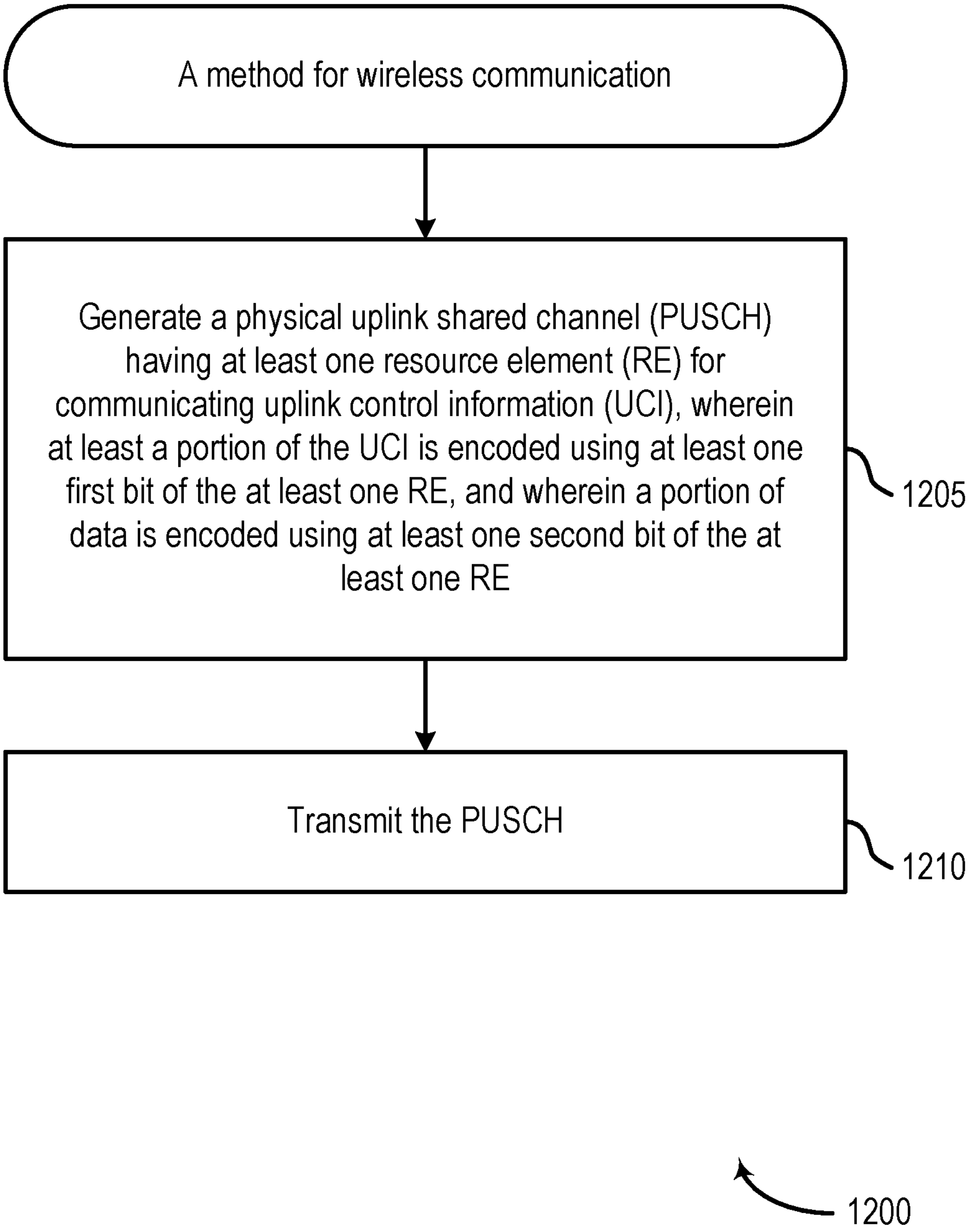
FIG. 12 shows an example of a method of wireless communication at a UE.

FIG. 12 shows an example of a method 1200 of wireless communication at a UE, such as a UE 104 of FIGS. 1 and 3.

Method 1200 begins at step 1205 with generating a physical uplink shared channel (PUSCH) having at least one resource element (RE) for communicating uplink control information (UCI), wherein at least a portion of the UCI is encoded and mapped to a first subset of bits (e.g., one or more bits) of the at least one RE, and wherein a portion of data is encoded and mapped to a second subset of bits (e.g., one or more other bits) of the at least one RE. In some cases, the operations of this step refer to, or may be performed by, circuitry for generating and/or code for generating as described with reference to FIG. 14.

Method 1200 then proceeds to step 1210 with transmitting the PUSCH including the UCI and the data. In some cases, the operations of this step refer to, or may be performed by, circuitry for transmitting and/or code for transmitting as described with reference to FIG. 14.

In some aspects, the first subset of bits comprises one or more most significant bits (MSBs) of the RE, and wherein the second subset of bits comprises one or more least significant bits (LSBs) of the RE.

In some aspects, the PUSCH comprises multiple code blocks (CBs) of data, the at least one RE comprising one or more REs in each of the multiple CBs for communicating UCI; and the portion of the data is evenly distributed among a subset of the multiple CBs and is to be encoded and mapped to the one or more REs of each of the subset of the multiple CBs.

In some aspects, the multiple CBs comprise a last CB on the PUSCH having the one or more REs for communicating UCI; and the last CB of the multiple CBs includes at least one more RE for communicating UCI than the subset of the multiple CBs.

In some aspects, the multiple CBs comprise a last CB on the PUSCH having the one or more REs for communicating UCI; and the last CB of the multiple CBs includes at least one less RE for communicating UCI than the subset of the multiple CBs.

In some aspects, bits corresponding to the UCI are assigned to the at least one RE in a frequency first, time second manner.

In some aspects, the PUSCH comprises multiple CBs, the at least one RE comprising one or more REs in each of the multiple CBs; and the portion of the data is encoded on and mapped to the one or more REs for each of a subset of the multiple CBs.

In some aspects, the method 1200 further includes receiving an indication of the subset of the multiple CBs on which the portion of the data is to be encoded. In some cases, the operations of this step refer to, or may be performed by, circuitry for receiving and/or code for receiving as described with reference to FIG. 14.

In some aspects, the subset of the multiple CBs comprises at least one CB of the PUSCH that is first in time.

In some aspects, the data is assigned to REs of the PUSCH in a time first, frequency second manner.

In some aspects, generating the PUSCH comprises: mapping bits corresponding to the data to REs of the PUSCH; and after the mapping of the bits corresponding to the data, puncturing one or more of the bits corresponding to the data to encode the UCI.

In some aspects, the portion of the UCI comprises hybrid automatic repeat request (HARQ) information; and puncturing the one or more of the bits comprises puncturing one or more most significant bits (MSBs) of the PUSCH to encode the HARQ information.

In some aspects, the HARQ information is assigned to the at least one RE that is next to a demodulation reference signal (DMRS).

In some aspects, the UCI comprises channel state information (CSI); and puncturing the one or more of the bits comprises puncturing one or more least significant bits (LSBs) of the PUSCH to encode the CSI.

In some aspects, the UCI comprises CSI encoded and mapped to REs of the PUSCH that are separated in a frequency domain.

Figure 14:
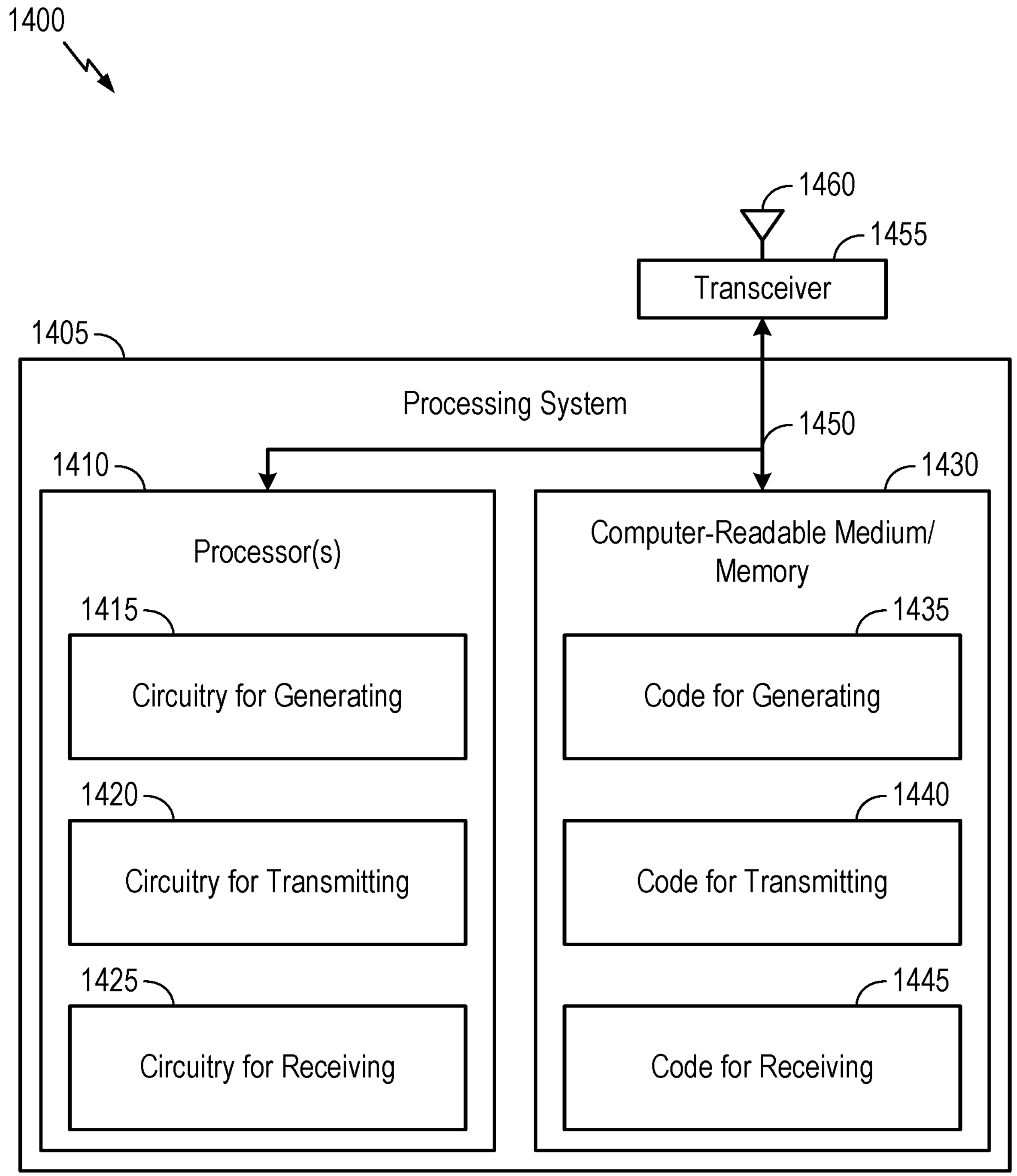
FIG. 14 depicts aspects of an example communications device.

In one aspect, method 1200, or any aspect related to it, may be performed by an apparatus, such as communications device 1400 of FIG. 14, which includes various components operable, configured, or adapted to perform the method 1200. Communications device 1400 is described below in further detail.

Note that FIG. 12 is just one example of a method, and other methods including fewer, additional, or alternative steps are possible consistent with this disclosure.

Figure 13:
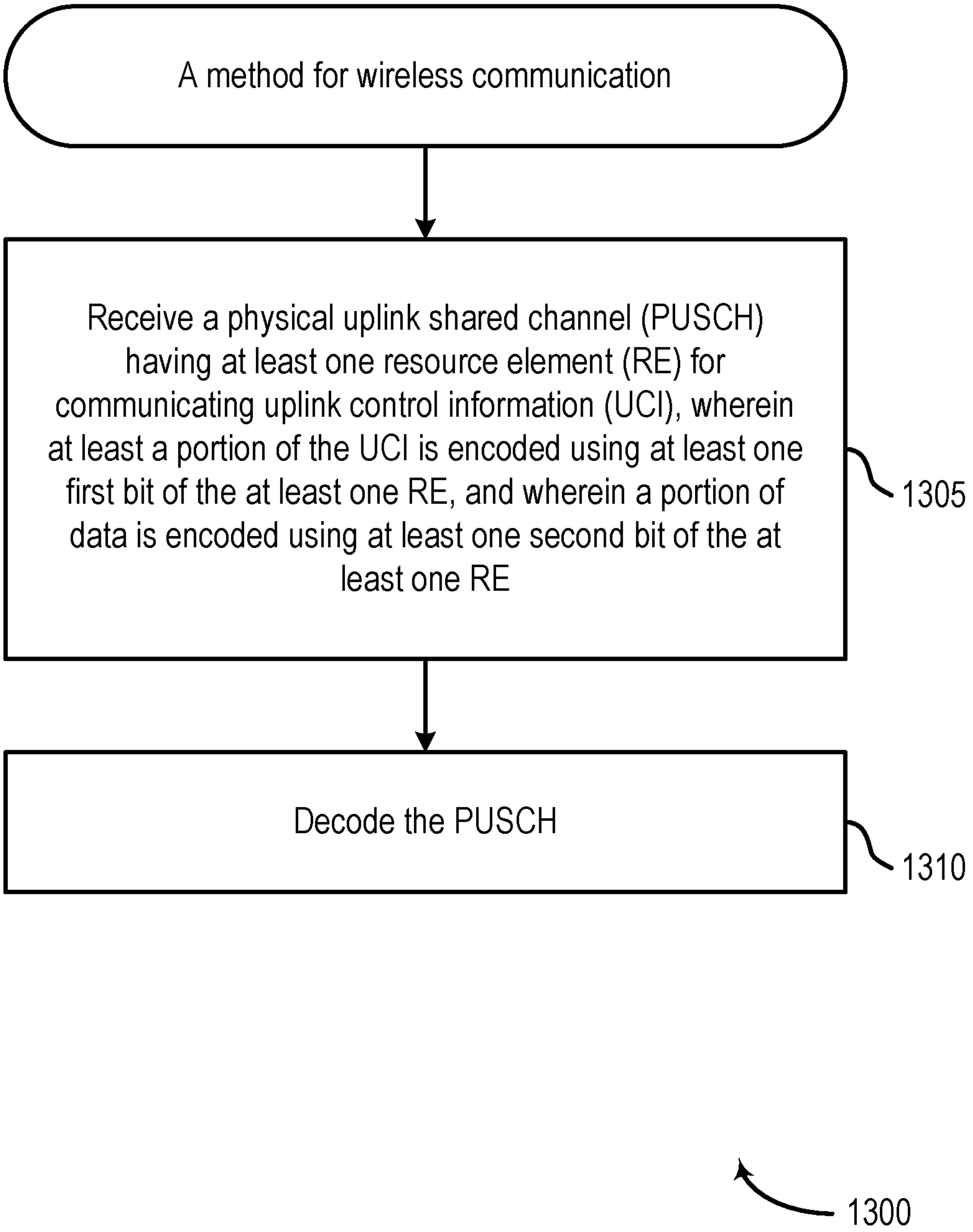
FIG. 13 shows an example of a method of wireless communication at a BS.

FIG. 13 shows an example of a method 1300 of wireless communication at a BS, such as a BS 102 of FIGS. 1 and 3, or a disaggregated base station as discussed with respect to FIG. 2.

Method 1300 begins at step 1305 with receiving a physical uplink shared channel (PUSCH) having at least one resource element (RE) for communicating uplink control information (UCI), wherein at least a portion of the UCI is encoded and mapped to a first subset of bits of the at least one RE, and wherein a portion of data is encoded and mapped to a second subset of bits of the at least one RE. In some cases, the operations of this step refer to, or may be performed by, circuitry for receiving and/or code for receiving as described with reference to FIG. 15.

Method 1300 then proceeds to step 1310 with decoding the PUSCH including the UCI and the data. In some cases, the operations of this step refer to, or may be performed by, circuitry for decoding and/or code for decoding as described with reference to FIG. 15.

In some aspects, the at least one first bit comprises one or more most significant bits (MSBs) of the at least one RE, and wherein the at least one second bit comprises one or more least significant bits (LSBs) of the at least one RE.

In some aspects, the PUSCH comprises multiple code blocks (CBs), the at least one RE comprising one or more REs in each of the multiple CBs for communicating UCI; and the portion of the data is evenly distributed among a subset of the multiple CBs and is to be encoded in the one or more REs of each of the subset of the multiple CBs.

In some aspects, the multiple CBs comprise a last CB on the PUSCH having the one or more REs for communicating UCI; and the last CB of the multiple CBs includes at least one more RE for communicating UCI than the subset of the multiple CBs.

In some aspects, the multiple CBs comprise a last CB on the PUSCH having the one or more REs for communicating UCI; and the last CB of the multiple CBs includes at least one less RE for communicating UCI than the subset of the multiple CBs.

In some aspects, bits corresponding to the UCI are assigned to the at least one RE in a frequency first, time second manner.

In some aspects, the PUSCH comprises multiple CBs, the at least one RE comprising one or more REs in each of the multiple CBs; and the portion of the data is encoded and mapped to the one or more REs for each of a subset of the multiple CBs.

In some aspects, the method 1300 further includes transmitting an indication of the subset of the multiple CBs on which the portion of the data is to be encoded. In some cases, the operations of this step refer to, or may be performed by, circuitry for transmitting and/or code for transmitting as described with reference to FIG. 15.

In some aspects, the method 1300 further includes determining the subset of the multiple CBs on which the portion of the data is to be encoded and mapped based on channel quality assessment associated with the subset of the multiple CBs. In some cases, the operations of this step refer to, or may be performed by, circuitry for determining and/or code for determining as described with reference to FIG. 15.

In some aspects, the subset of the multiple CBs comprises at least one CB of the PUSCH that is first in time.

In some aspects, the data is assigned to REs of the PUSCH in a time first, frequency second manner.

In some aspects, bits corresponding to the data are mapped to REs of the PUSCH; and one or more of the bits corresponding to the data are punctured to encode the UCI.

In some aspects, the portion of the UCI comprises hybrid automatic repeat request (HARQ) information; and the one or more of the bits punctured to encode the UCI comprises one or more most significant bits (MSBs) of the PUSCH punctured to encode the HARQ information.

In some aspects, the HARQ information is assigned to the at least one RE that is next to a demodulation reference signal (DMRS).

In some aspects, the UCI comprises channel state information (CSI); and the one or more of the bits punctured to encode the UCI comprises one or more least significant bits (LSBs) of the PUSCH punctured to encode the CSI.

In some aspects, the UCI comprises CSI encoded and mapped to REs of the PUSCH that are separated in a frequency domain.

Figure 15:
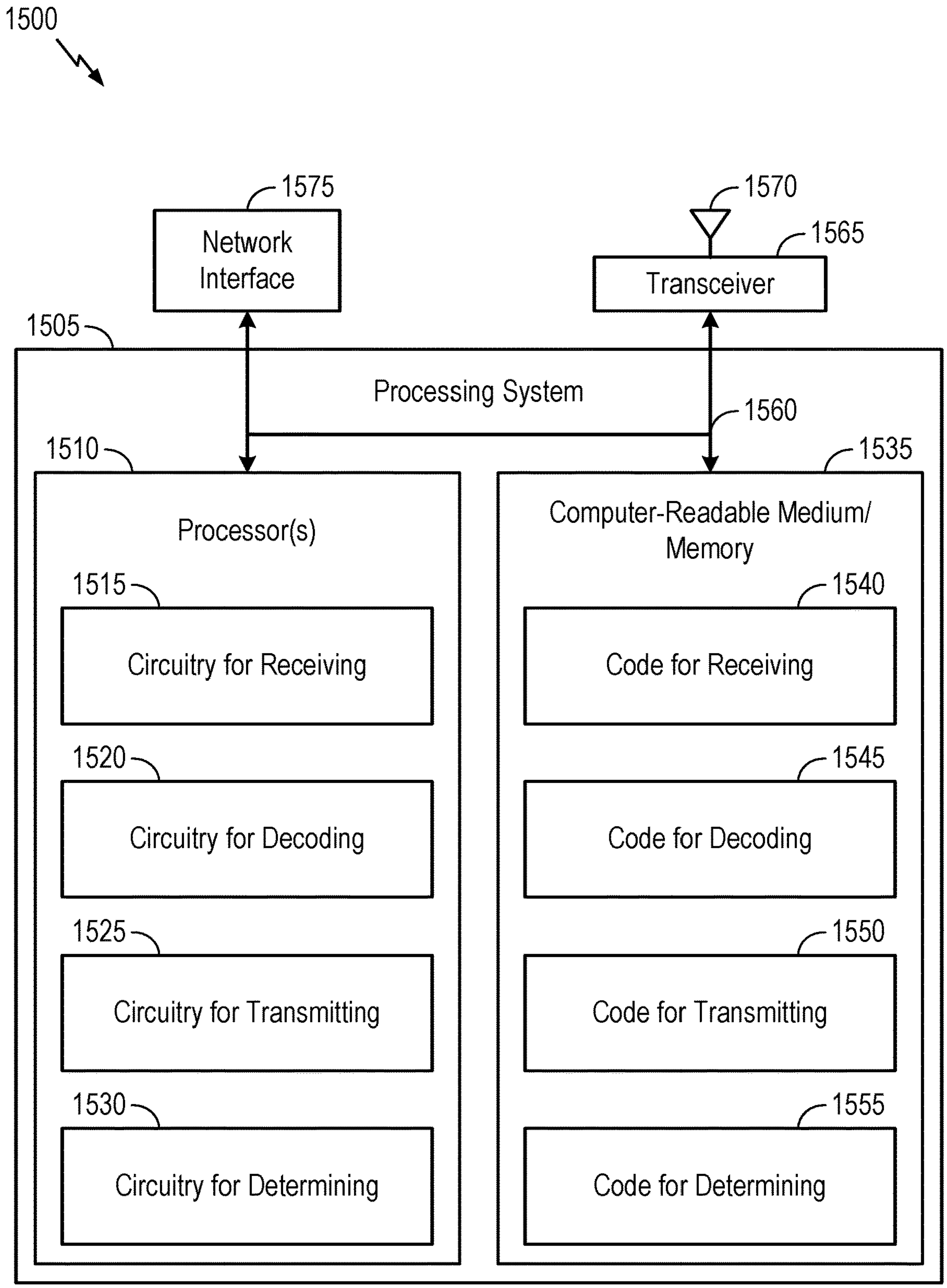
FIG. 15 depicts aspects of an example communications device.

In one aspect, method 1300, or any aspect related to it, may be performed by an apparatus, such as communications device 1500 of FIG. 15, which includes various components operable, configured, or adapted to perform the method 1300. Communications device 1500 is described below in further detail.

Note that FIG. 13 is just one example of a method, and other methods including fewer, additional, or alternative steps are possible consistent with this disclosure.

Example Communications Device(s)

FIG. 14 depicts aspects of an example communications device 1400. In some aspects, communications device 1400 is a user equipment, such as UE 104 described above with respect to FIGS. 1 and 3.

The communications device 1400 includes a processing system 1405 coupled to the transceiver 1455 (e.g., a transmitter and/or a receiver). The transceiver 1455 is configured to transmit and receive signals for the communications device 1400 via the antenna 1460, such as the various signals as described herein. The processing system 1405 may be configured to perform processing functions for the communications device 1400, including processing signals received and/or to be transmitted by the communications device 1400.

The processing system 1405 includes one or more processors 1410. In various aspects, the one or more processors 1410 may be representative of one or more of receive processor 358, transmit processor 364, TX MIMO processor 366, and/or controller/processor 380, as described with respect to FIG. 3. The one or more processors 1410 are coupled to a computer-readable medium/memory 1430 via a bus 1450. In certain aspects, the computer-readable medium/memory 1430 is configured to store instructions (e.g., computer-executable code) that when executed by the one or more processors 1410, cause the one or more processors 1410 to perform the method 1200 described with respect to FIG. 12, or any aspect related to it. Note that reference to a processor performing a function of communications device 1400 may include one or more processors 1410 performing that function of communications device 1400.

In the depicted example, computer-readable medium/memory 1430 stores code (e.g., executable instructions), such as code for generating 1435, code for transmitting 1440, and code for receiving 1445. Processing of the code for generating 1435, code for transmitting 1440, and code for receiving 1445 may cause the communications device 1400 to perform the method 1200 described with respect to FIG. 12, or any aspect related to it.

The one or more processors 1410 include circuitry configured to implement (e.g., execute) the code stored in the computer-readable medium/memory 1430, including circuitry such as circuitry for generating 1415, circuitry for transmitting 1420, and circuitry for receiving 1425. Processing with circuitry for generating 1415, circuitry for transmitting 1420, and circuitry for receiving 1425 may cause the communications device 1400 to perform the method 1200 described with respect to FIG. 12, or any aspect related to it.

Various components of the communications device 1400 may provide means for performing the method 1200 described with respect to FIG. 12, or any aspect related to it. For example, means for transmitting, sending or outputting for transmission may include transceivers 354 and/or antenna(s) 352 of the UE 104 illustrated in FIG. 3 and/or the transceiver 1455 and the antenna 1460 of the communications device 1400 in FIG. 14. Means for receiving or obtaining may include transceivers 354 and/or antenna(s) 352 of the UE 104 illustrated in FIG. 3 and/or the transceiver 1455 and the antenna 1460 of the communications device 1400 in FIG. 14.

FIG. 15 depicts aspects of an example communications device 1500. In some aspects, communications device 1500 is a network entity, such as BS 102 of FIGS. 1 and 3, or a disaggregated base station as discussed with respect to FIG. 2.

The communications device 1500 includes a processing system 1505 coupled to the transceiver 1565 (e.g., a transmitter and/or a receiver) and/or a network interface 1575. The transceiver 1565 is configured to transmit and receive signals for the communications device 1500 via the antenna 1570, such as the various signals as described herein. The network interface 1575 is configured to obtain and send signals for the communications device 1500 via communication link(s), such as a backhaul link, midhaul link, and/or fronthaul link as described herein, such as with respect to FIG. 2. The processing system 1505 may be configured to perform processing functions for the communications device 1500, including processing signals received and/or to be transmitted by the communications device 1500.

The processing system 1505 includes one or more processors 1510. In various aspects, one or more processors 1510 may be representative of one or more of receive processor 338, transmit processor 320, TX MIMO processor 330, and/or controller/processor 340, as described with respect to FIG. 3. The one or more processors 1510 are coupled to a computer-readable medium/memory 1535 via a bus 1560. In certain aspects, the computer-readable medium/memory 1535 is configured to store instructions (e.g., computer-executable code) that when executed by the one or more processors 1510, cause the one or more processors 1510 to perform the method 1300 described with respect to FIG. 13, or any aspect related to it. Note that reference to a processor of communications device 1500 performing a function may include one or more processors 1510 of communications device 1500 performing that function.

In the depicted example, the computer-readable medium/memory 1535 stores code (e.g., executable instructions), such as code for receiving 1540, code for decoding 1545, code for transmitting 1550, and code for determining 1555. Processing of the code for receiving 1540, code for decoding 1545, code for transmitting 1550, and code for determining 1555 may cause the communications device 1500 to perform the method 1300 described with respect to FIG. 13, or any aspect related to it.

The one or more processors 1510 include circuitry configured to implement (e.g., execute) the code stored in the computer-readable medium/memory 1535, including circuitry such as circuitry for receiving 1515, circuitry for decoding 1520, circuitry for transmitting 1525, and circuitry for determining 1530. Processing with circuitry for receiving 1515, circuitry for decoding 1520, circuitry for transmitting 1525, and circuitry for determining 1530 may cause the communications device 1500 to perform the method 1300 described with respect to FIG. 13, or any aspect related to it.

Various components of the communications device 1500 may provide means for performing the method 1300 described with respect to FIG. 13, or any aspect related to it.

Means for transmitting, sending or outputting for transmission may include transceivers 332 and/or antenna(s) 334 of the BS 102 illustrated in FIG. 3 and/or the transceiver 1565 and the antenna 1570 of the communications device 1500 in FIG. 15. Means for receiving or obtaining may include transceivers 332 and/or antenna(s) 334 of the BS 102 illustrated in FIG. 3 and/or the transceiver 1565 and the antenna 1570 of the communications device 1500 in FIG. 15.

Example Aspects

Implementation examples are described in the following numbered aspects:

Aspect 1: A method for wireless communication, comprising: generating a physical uplink shared channel (PUSCH) having at least one resource element (RE) for communicating uplink control information (UCI), wherein at least a portion of the UCI is encoded and mapped to a first subset of bits of the at least one RE, and wherein a portion of data is encoded and mapped to at least a second subset of bits of the at least one RE; and transmitting the PUSCH including the UCI and the data.

Aspect 2: The method of Aspect 1, wherein the first subset of bits comprises one or more most significant bits (MSBs) of the RE, and wherein the second subset of bits comprises one or more least significant bits (LSBs) of the RE.

Aspect 3: The method of Aspect 1 or 2, wherein: the PUSCH comprises multiple code blocks (CBs) of data, the at least one RE comprising one or more REs in each of the multiple CBs for communicating UCI; and the portion of the data is evenly distributed among a subset of the multiple CBs and is to be encoded and mapped to the one or more REs of each of the subset of the multiple CBs.

Aspect 4: The method of Aspect 3, wherein: the multiple CBs comprise a last CB on the PUSCH having the one or more REs for communicating UCI; and the last CB of the multiple CBs includes at least one more RE for communicating UCI than the subset of the multiple CBs.

Aspect 5: The method of Aspect 3 or 4, wherein: the multiple CBs comprise a last CB on the PUSCH having the one or more REs for communicating UCI; and the last CB of the multiple CBs includes at least one less RE for communicating UCI than the subset of the multiple CBs.

Aspect 6: The method according to any of Aspects 1-5, wherein bits corresponding to the UCI are assigned to the at least one RE in a frequency first, time second manner.

Aspect 7: The method according to any of Aspects 1-6, wherein: the PUSCH comprises multiple CBs, the at least one RE comprising one or more REs in each of the multiple CBs; and the portion of the data is encoded on and mapped to the one or more REs for each of a subset of the multiple CBS.

Aspect 8: The method of Aspect 7, further comprising receiving an indication of the subset of the multiple CBs on which the portion of the data is to be encoded.

Aspect 9: The method of Aspect 7 or 8, wherein the subset of the multiple CBs comprises at least one CB of the PUSCH that is first in time.

Aspect 10: The method according to any of Aspects 1-9, wherein the data is assigned to REs of the PUSCH in a time first, frequency second manner.

Aspect 11: The method according to any of Aspects 1-10, wherein generating the PUSCH comprises: mapping bits corresponding to the data to REs of the PUSCH; and after the mapping of the bits corresponding to the data, puncturing one or more of the bits corresponding to the data to encode the UCI.

Aspect 12: The method according to any of Aspects 1-11, wherein: the portion of the UCI comprises hybrid automatic repeat request (HARQ) information; and puncturing the one or more of the bits comprises puncturing one or more most significant bits (MSBs) of the PUSCH to encode the HARQ information.

Aspect 13: The method of Aspect 12, wherein the HARQ information is assigned to the at least one RE that is next to a demodulation reference signal (DMRS).

Aspect 14: The method of Aspect 12 or 13, wherein: the UCI comprises channel state information (CSI); and puncturing the one or more of the bits comprises puncturing one or more least significant bits (LSBs) of the PUSCH to encode the CSI.

Aspect 15: The method of Aspect 14, wherein the UCI comprises CSI encoded and mapped to REs of the PUSCH that are separated in a frequency domain.

Aspect 16: A method for wireless communication, comprising: receiving a physical uplink shared channel (PUSCH) having at least one resource element (RE) for communicating uplink control information (UCI), wherein at least a portion of the UCI is encoded and mapped to a first subset of bits of the at least one RE, and wherein a portion of data is encoded and mapped to a second subset of bits of the at least one RE; and decoding the PUSCH including the UCI and the data.

Aspect 17: The method of Aspect 16, wherein the first subset of bits comprises one or more most significant bits (MSBs) of the RE, and wherein the second subset of bits comprises one or more least significant bits (LSBs) of the RE.

Aspect 18: The method of Aspect 16 or 17, wherein: the PUSCH comprises multiple code blocks (CBs) of data, the at least one RE comprising one or more REs in each of the multiple CBs for communicating UCI; and the portion of the data is evenly distributed among a subset of the multiple CBs and is to be encoded and mapped to the one or more REs of each of the subset of the multiple CBs.

Aspect 19: The method of Aspect 18, wherein: the multiple CBs comprise a last CB on the PUSCH having the one or more REs for communicating UCI; and the last CB of the multiple CBs includes at least one more RE for communicating UCI than the subset of the multiple CBs.

Aspect 20: The method of Aspect 18 or 19, wherein: the multiple CBs comprise a last CB on the PUSCH having the one or more REs for communicating UCI; and the last CB of the multiple CBs includes at least one less RE for communicating UCI than the subset of the multiple CBs.

Aspect 21: The method according to any of Aspects 16-20, wherein bits corresponding to the UCI are assigned to the at least one RE in a frequency first, time second manner.

Aspect 22: The method according to any of Aspects 16-21, wherein: the PUSCH comprises multiple CBs, the at least one RE comprising one or more REs in each of the multiple CBs; and the portion of the data is encoded on and mapped to the one or more REs for each of a subset of the multiple CBs.

Aspect 23: The method of Aspect 22, further comprising transmitting an indication of the subset of the multiple CBs on which the portion of the data is to be encoded.

Aspect 24: The method of Aspect 23, further comprising determining the subset of the multiple CBs on which the portion of the data is to be encoded and mapped based on channel quality assessment associated with the subset of the multiple CBs.

Aspect 25: The method according to any of Aspects 22-24, wherein the subset of the multiple CBs comprises at least one CB of the PUSCH that is first in time.

Aspect 26: The method according to any of Aspects 16-25, wherein the data is assigned to REs of the PUSCH in a time first, frequency second manner.

Aspect 27: The method according to any of Aspects 16-26, wherein: bits corresponding to the data are mapped to REs of the PUSCH; and one or more of the bits corresponding to the data are punctured to encode the UCI.

Aspect 28: The method according to any of Aspects 16-27, wherein: the portion of the UCI comprises hybrid automatic repeat request (HARQ) information; and the one or more of the bits punctured to encode the UCI comprises one or more most significant bits (MSBs) of the PUSCH punctured to encode the HARQ information.

Aspect 29: The method of Aspect 28, wherein the HARQ information is assigned to the at least one RE that is next to a demodulation reference signal (DMRS).

Aspect 30: The method of Aspect 28 or 29, wherein: the UCI comprises channel state information (CSI); and the one or more of the bits punctured to encode the UCI comprises one or more least significant bits (LSBs) of the PUSCH punctured to encode the CSI.

Aspect 31: The method according to any of Aspects 16-30, wherein the UCI comprises CSI encoded and mapped to REs of the PUSCH that are separated in a frequency domain.

Aspect 32: An apparatus, comprising: a memory comprising executable instructions; and a processor configured to execute the executable instructions and cause the apparatus to perform a method in accordance with any one of Aspects 1-31.

Aspect 33: An apparatus, comprising means for performing a method in accordance with any one of Aspects 1-31.

Aspect 34: A non-transitory computer-readable medium comprising executable instructions that, when executed by a processor of an apparatus, cause the apparatus to perform a method in accordance with any one of Aspects 1-31.

Aspect 35: A computer program product embodied on a computer-readable storage medium comprising code for performing a method in accordance with any one of Aspects 1-31.

Aspect 36: A user equipment (UE), comprising: at least one transceiver; a memory comprising executable instructions; and a processor configured to execute the executable instructions and cause the apparatus to perform a method in accordance with any one of Aspects 1-15, wherein the at least one transceiver is configured to receive the first and second indications.

Aspect 37: A network entity, comprising: at least one transceiver; a memory comprising executable instructions; and a processor configured to execute the executable instructions and cause the apparatus to perform a method in accordance with any one of Aspects 16-31, wherein the at least one transceiver is configured to transmit the first and second indications.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a graphics processing unit (GPU), a neural processing unit (NPU), a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, "a processor," "at least one processor" or "one or more processors" generally refers to a single processor configured to perform one or multiple operations or multiple processors configured to collectively perform one or more operations. In the case of multiple processors, performance of the one or more operations could be divided amongst different processors, though one processor may perform multiple operations, and multiple processors could collectively perform a single operation. Similarly, "a memory," "at least one memory" or "one or more memories" generally refers to a single memory configured to store data and/or instructions, multiple memories configured to collectively store data and/or instructions.

Means for generating, means for transmitting, means for receiving, means for decoding, and means for determining may comprise one or more processors, such as one or more of the processors described above with reference to FIG. 14, and FIG. 15.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication, comprising:

generating a physical uplink shared channel (PUSCH) having at least one resource element (RE) for communicating uplink control information (UCI), wherein at least a portion of the UCI is encoded and mapped to a first subset of bits of the at least one RE, and wherein a portion of data is encoded and mapped to at least a second subset of bits of the at least one RE, wherein the PUSCH comprises multiple code blocks (CBs) of data, the at least one RE comprising one or more REs in each of the multiple CBs for communicating UCI, and wherein the portion of the data is evenly distributed among a subset of the multiple CBs and is to be encoded and mapped to the one or more REs of each of the subset of the multiple CBs; and transmitting the PUSCH including the UCI and the data.

2. The method of claim 1, wherein the first subset of bits comprises one or more most significant bits (MSBs) of the RE, and wherein the second subset of bits comprises one or more least significant bits (LSBs) of the RE.

3. The method of claim 1, wherein:

the multiple CBs comprise a last CB on the PUSCH having the one or more REs for communicating UCI; and the last CB of the multiple CBs includes at least one more RE for communicating UCI than the subset of the multiple CBs.

4. The method of claim 1, wherein:

the multiple CBs comprise a last CB on the PUSCH having the one or more REs for communicating UCI; and the last CB of the multiple CBs includes at least one less RE for communicating UCI than the subset of the multiple CBs.

5. The method of claim 1, wherein bits corresponding to the UCI are assigned to the at least one RE in a frequency first, time second manner.

6. The method of claim 1, wherein:

the PUSCH comprises multiple CBs, the at least one RE comprising one or more REs in each of the multiple CBs; and the portion of the data is encoded on and mapped to the one or more REs for each of a subset of the multiple CBs.

7. The method of claim 6, further comprising receiving an indication of the subset of the multiple CBs on which the portion of the data is to be encoded.

8. The method of claim 6, wherein the subset of the multiple CBs comprises at least one CB of the PUSCH that is first in time.

9. The method of claim 1, wherein the data is assigned to REs of the PUSCH in a time first, frequency second manner.

10. The method of claim 1, wherein generating the PUSCH comprises:

mapping bits corresponding to the data to REs of the PUSCH; and after the mapping of the bits corresponding to the data, puncturing one or more of the bits corresponding to the data to encode the UCI.

11. The method of claim 1, wherein:

the portion of the UCI comprises hybrid automatic repeat request (HARQ) information; and puncturing the one or more of the bits comprises puncturing one or more most significant bits (MSBs) of the PUSCH to encode the HARQ information.

12. The method of claim 11, wherein the HARQ information is assigned to the at least one RE that is next to a demodulation reference signal (DMRS).

13. The method of claim 11, wherein:

the UCI comprises channel state information (CSI); and puncturing the one or more of the bits comprises puncturing one or more least significant bits (LSBs) of the PUSCH to encode the CSI.

14. The method of claim 13, wherein the UCI comprises CSI encoded and mapped to REs of the PUSCH that are separated in a frequency domain.

15. A method for wireless communication, comprising:

receiving a physical uplink shared channel (PUSCH) having at least one resource element (RE) for communicating uplink control information (UCI), wherein at least a portion of the UCI is encoded and mapped to a first subset of bits of the at least one RE, and wherein a portion of data is encoded and mapped to a second subset of bits of the at least one RE, wherein the PUSCH comprises multiple code blocks (CBs) of data, the at least one RE comprising one or more REs in each of the multiple CBs for communicating UCI, and wherein the portion of the data is evenly distributed among a subset of the multiple CBs and is encoded and mapped to the one or more REs of each of the subset of the multiple CBs; and decoding the PUSCH including the UCI and the data.

16. The method of claim 15, wherein the first subset of bits comprises one or more most significant bits (MSBs) of the RE, and wherein the second subset of bits comprises one or more least significant bits (LSBs) of the RE.

17. An apparatus for wireless communication, comprising:

a memory; and one or more processors coupled to the memory, wherein the one or more processors are configured to:

generate a physical uplink shared channel (PUSCH) having at least one resource element (RE) for communicating uplink control information (UCI), wherein at least a portion of the UCI is encoded and mapped to a first subset of bits of the at least one RE, and wherein a portion of data is encoded and mapped to at least a second subset of bits of the at least one RE, wherein the PUSCH comprises multiple code blocks (CBs) of data, the at least one RE comprising one or more REs in each of the multiple CBs for communicating UCI, and wherein the portion of the data is evenly distributed among a subset of the multiple CBs and is to be encoded and mapped to the one or more REs of each of the subset of the multiple CBs; and transmit the PUSCH including the UCI and the data.

18. An apparatus for wireless communication, comprising:

a memory; and one or more processors coupled to the memory, wherein the one or more processors are configured to:

receive a physical uplink shared channel (PUSCH) having at least one resource element (RE) for communicating uplink control information (UCI), wherein at least a portion of the UCI is encoded and mapped to a first subset of bits of the at least one RE, and wherein a portion of data is encoded and mapped to a second subset of bits of the at least one RE, wherein the PUSCH comprises multiple code blocks (CBs) of data, the at least one RE comprising one or more REs in each of the multiple CBs for communicating UCI, and wherein the portion of the data is evenly distributed among a subset of the multiple CBs and is encoded and mapped to the one or more REs of each of the subset of the multiple CBs; and decode the PUSCH including the UCI and the data.

* * * * *